United States Patent
Martin et al.

(10) Patent No.: US 8,078,151 B2
(45) Date of Patent: Dec. 13, 2011

(54) METHOD AND SYSTEM TO AUTOMATICALLY PARK A VOICE CALL FOR DATA TRANSFER

(75) Inventors: Daryl Martin, Waterloo (CA); James Godfrey, Waterloo (CA); J. F. Sean Wilson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 333 days.

(21) Appl. No.: 12/390,936

(22) Filed: Feb. 23, 2009

(65) Prior Publication Data

US 2010/0216435 A1    Aug. 26, 2010

(51) Int. Cl.
*H04M 3/42* (2006.01)
(52) U.S. Cl. ............ 455/414.1; 455/414.4; 455/445; 370/338; 370/352; 370/389; 379/201.01
(58) Field of Classification Search ............ 455/414.1, 455/414.4, 445; 370/338, 352, 389
See application file for complete search history.

(56) References Cited

U.S. PATENT DOCUMENTS

| | | | |
|---|---|---|---|
| 5,999,613 A | 12/1999 | Nabkel et al. | |
| 6,870,917 B2 | 3/2005 | Chen et al. | |
| 7,133,515 B1 | 11/2006 | Cook | |
| 7,693,509 B2 * | 4/2010 | Miyata | 455/414.1 |
| 2002/0111167 A1 | 8/2002 | Nguyen et al. | |
| 2002/0122401 A1 * | 9/2002 | Xiang et al. | 370/338 |
| 2004/0092252 A1 * | 5/2004 | Gustavsson et al. | 455/412.2 |
| 2008/0130554 A1 * | 6/2008 | Gisby et al. | 370/328 |
| 2009/0061832 A1 * | 3/2009 | Goggans et al. | 455/414.1 |

FOREIGN PATENT DOCUMENTS

| | | |
|---|---|---|
| EP | 1560456 B1 | 1/2005 |
| JP | 61212950 A | 9/1986 |
| WO | 2008/008242 A2 | 1/2008 |

OTHER PUBLICATIONS

Alan Johnston et al. "SIP Service Examples: draft-ietf-sip-service-examples-01.txt" IETF Standard-Working-Draft, Internet Engineering Task Force, IETF, CH, vol. sip, No. 1, Mar. 1, 2001, XP015028078 ISSN: 0000-0004.
Halonen T., et al.: "GSM, GPRS, and EDGE performance: evolution towards 3G/UMTS" 2003, John Wiley & Sons Ltd., XP002539863, ISBN: 978-0-470-86694-8.
European Patent Application No. 09 15 3458 Search Report dated Aug. 19, 2009.
European Patent Application No. EP 09 15 4029 Search Report dated Aug. 7, 2009.

* cited by examiner

*Primary Examiner* — Kamran Afshar
*Assistant Examiner* — Khalid Shaheed
(74) *Attorney, Agent, or Firm* — Perry+Currier Inc.

(57) ABSTRACT

A system and method to automatically park a voice call on a mobile electronic device so that the device can receive data, comprising a switch for establishing a voice call at the at least one caller device, a database for storing at least one call processing rule, and an enterprise data server for receiving a data message, comparing contents of the data message with at least one rule in the database, and in the event that the contents match the rule then parking the call, switching the mobile electronic device to a data mode of operation, downloading the data message to the device and un-parking the call.

8 Claims, 9 Drawing Sheets

METHOD AND SYSTEM TO AUTOMATICALLY PARK A VOICE CALL FOR DATA TRANSFER

TECHNICAL FIELD

The present disclosure relates generally to mobile electronic devices, and more particularly to a method to automatically park a voice call on a mobile electronic device so that the device can receive data.

BACKGROUND

Second generation (2G) cellular telecom networks have been in commercial use since 1991, and include GSM (Global System for Mobile Communications) for voice, with which Enhanced Data rates for GSM Evolution (EDGE), Enhanced GPRS (EGPRS), may be used. EDGE/EGPRS is a backward-compatible digital mobile phone technology that allows improved data transmission rates, as an extension on top of standard GSM on 2G networks. Although 2G networks allow for both digitally encrypted voice conversations and data services, they do not permit simultaneous voice and data communications. Thus, all data traffic to 2G mobile electronic devices is blocked whenever a user is engaged in a voice call. If the user is on a call for an extended period of time, there may be circumstances in which critical data is prevented from reaching the device. For example, a user may be on an extended call while supervisors or family members are urgently trying to contact him/her via email. Or, if a user's mobile device has been lost or stolen and an authorized voice call is made from the device, any attempts to remotely disable the device (e.g. an IT kill command) will fail while the voice call is in progress. The same shortcomings apply to CDMA (Code Division Multiple Access) cellular telecom networks.

Third generation (3G) cellular telecom networks, including UMTS, permit simultaneous voice and data traffic but require a much longer time (second(s)) to establish a call, which introduces latency in the receipt of data. Also, since the radio must be on for several seconds before any data is exchanged, 3G devices exhibit heavier battery use. In addition, UMTS connections use more power while in an idle state than 2G devices. For at least these reasons, 2G devices continue to remain popular.

Accordingly, it is desirable to provide integration of voice and data services over networks that do not support simultaneous voice/data communication, such as CDMA and 2G cellular telecom networks. It is also desirable to provide a mechanism for faster downloading of important data to 3G devices that are in use for voice calling.

DETAILED DESCRIPTION

According to an aspect of this specification, there is provided a method to automatically park a voice call on a mobile electronic device so that the device can receive data, comprising comparing contents of said data with at least one rule; and in the event that the contents match said at least one rule then parking the call, switching the mobile electronic device to a data mode of operation, downloading the data to the device and un-parking the call.

According to another aspect, there is provided a system, comprising at least one mobile electronic device having a voice mode and a data mode of operation; a switch for establishing a voice call at the at least one mobile electronic device; a database for storing at least one call processing rule; an enterprise data server receiving data intended for the mobile electronic device, accessing the database and comparing contents of the data with the at least one rule; and in the event that the contents match the at least one rule then notifying the switch to park the call, switching the device to a data mode of operation and downloading the data to the device while the switch has parked the call, and notifying the switch to un-park the call.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
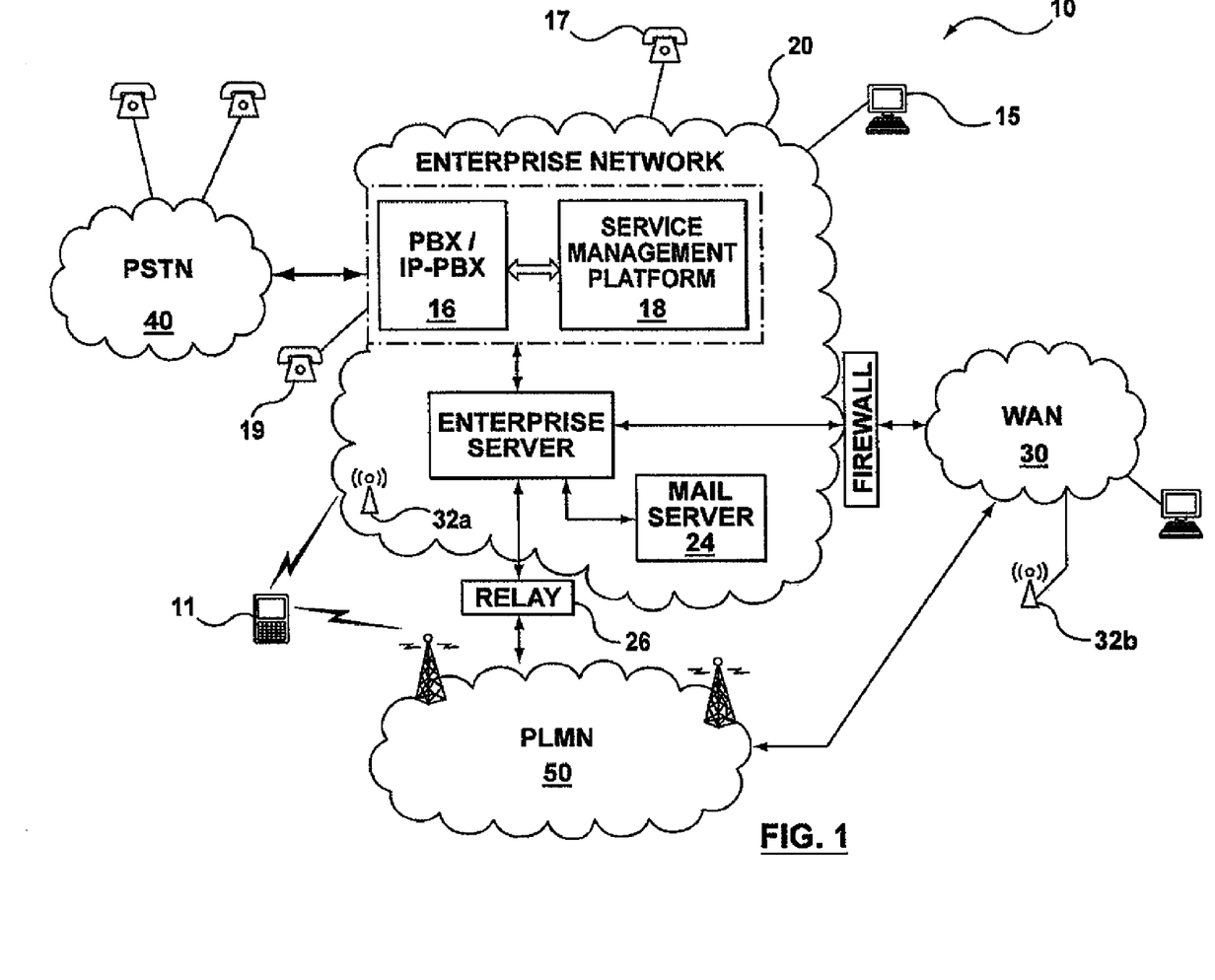
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or connect legs of other media sessions. In some embodiments, in the context of voice calls the enterprise communications, platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 19. Example features may include direct extension dialing, enterprise voice mail, conferencing, call transfer, call park, etc.

Figure 2:
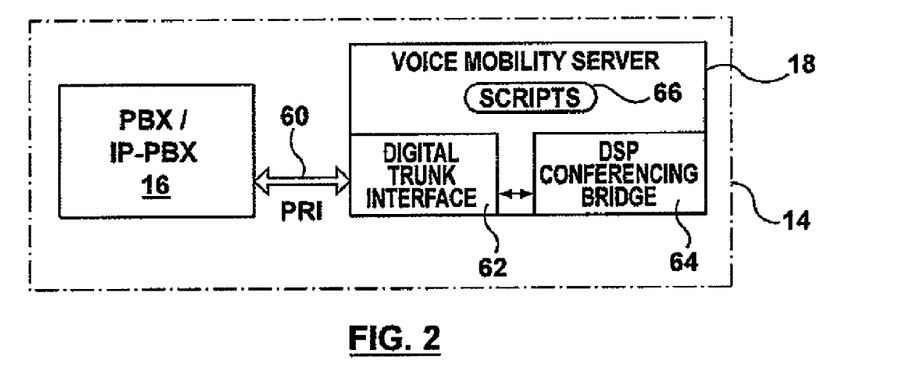
FIG. 2 shows, in block diagram form, further details of an embodiment of the enterprise communications platform.
Figure 3:
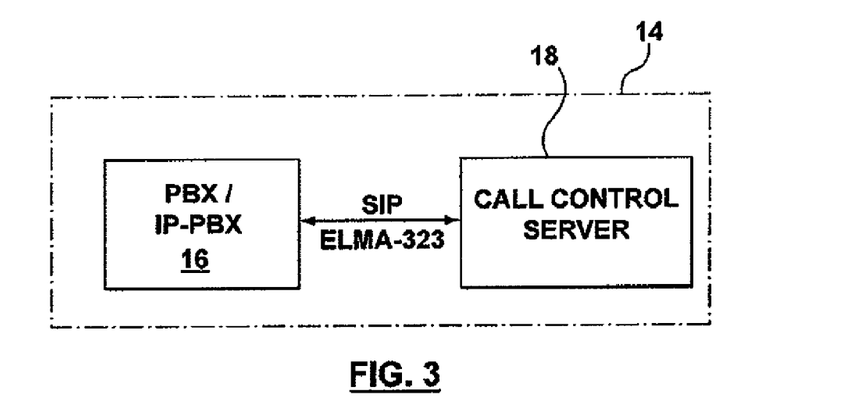
FIG. 3 shows another embodiment of the enterprise communications platform.
Figure 4:
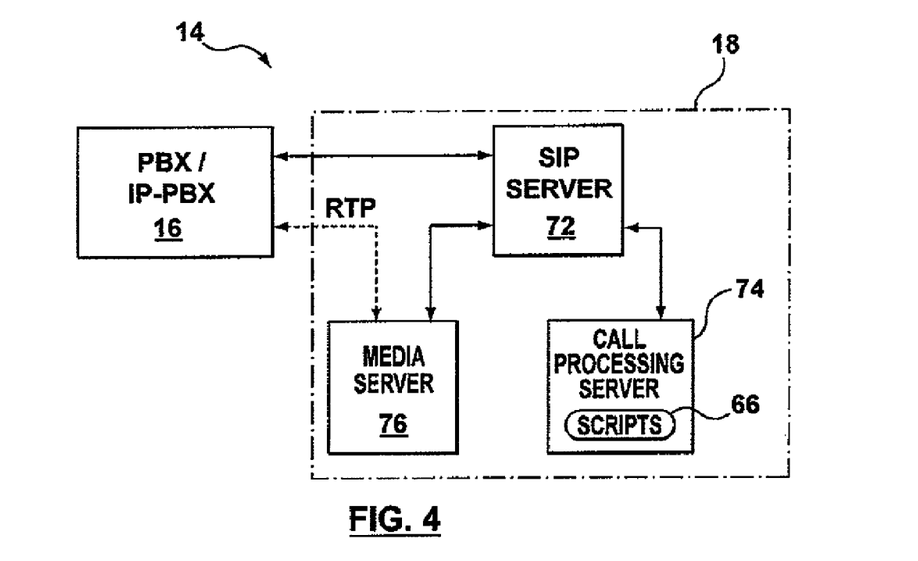
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
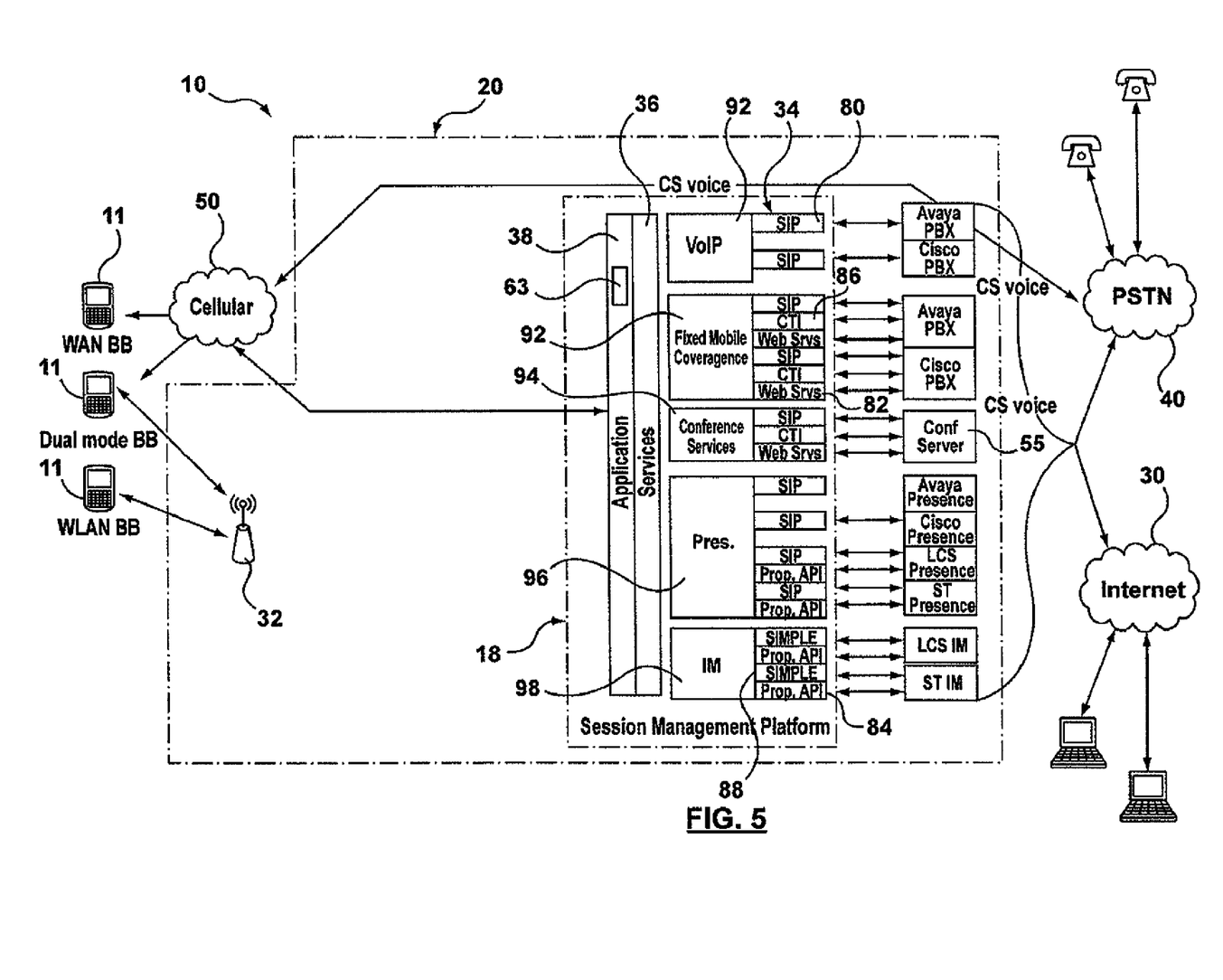
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIGS. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
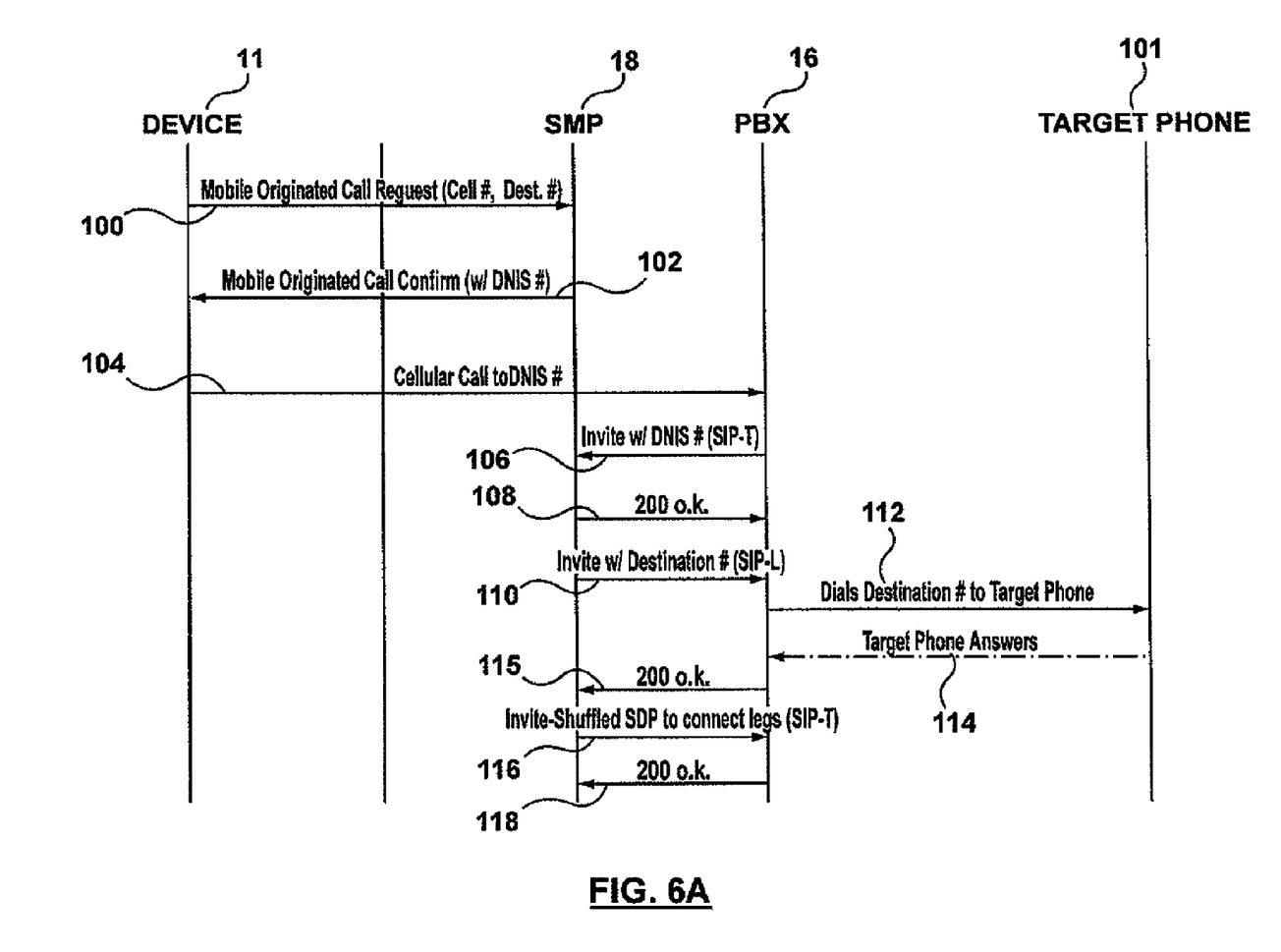
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
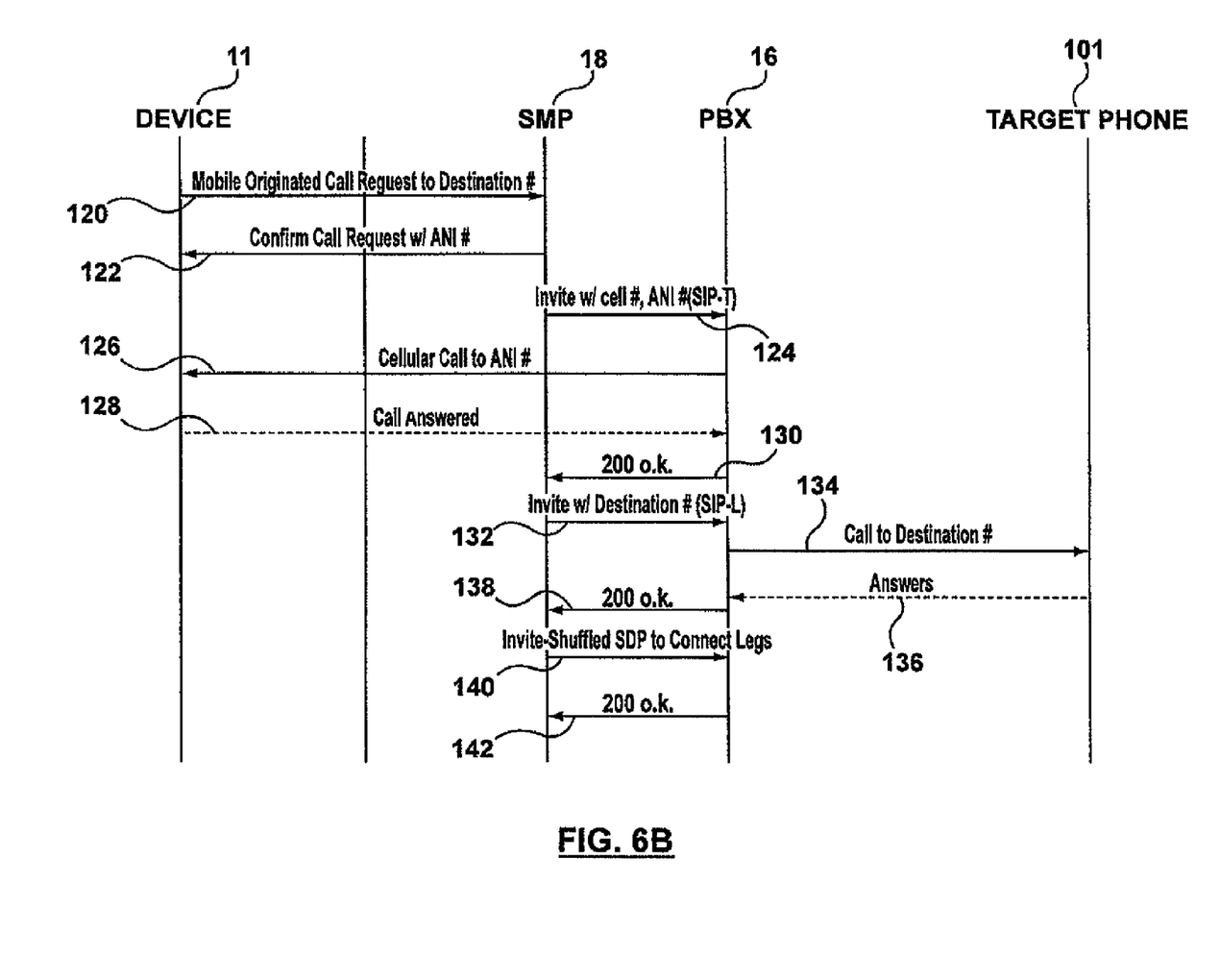
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18 (block 142), and the users of the device 11 and target phone 101 are able to communicate with each other.

Figure 7A:
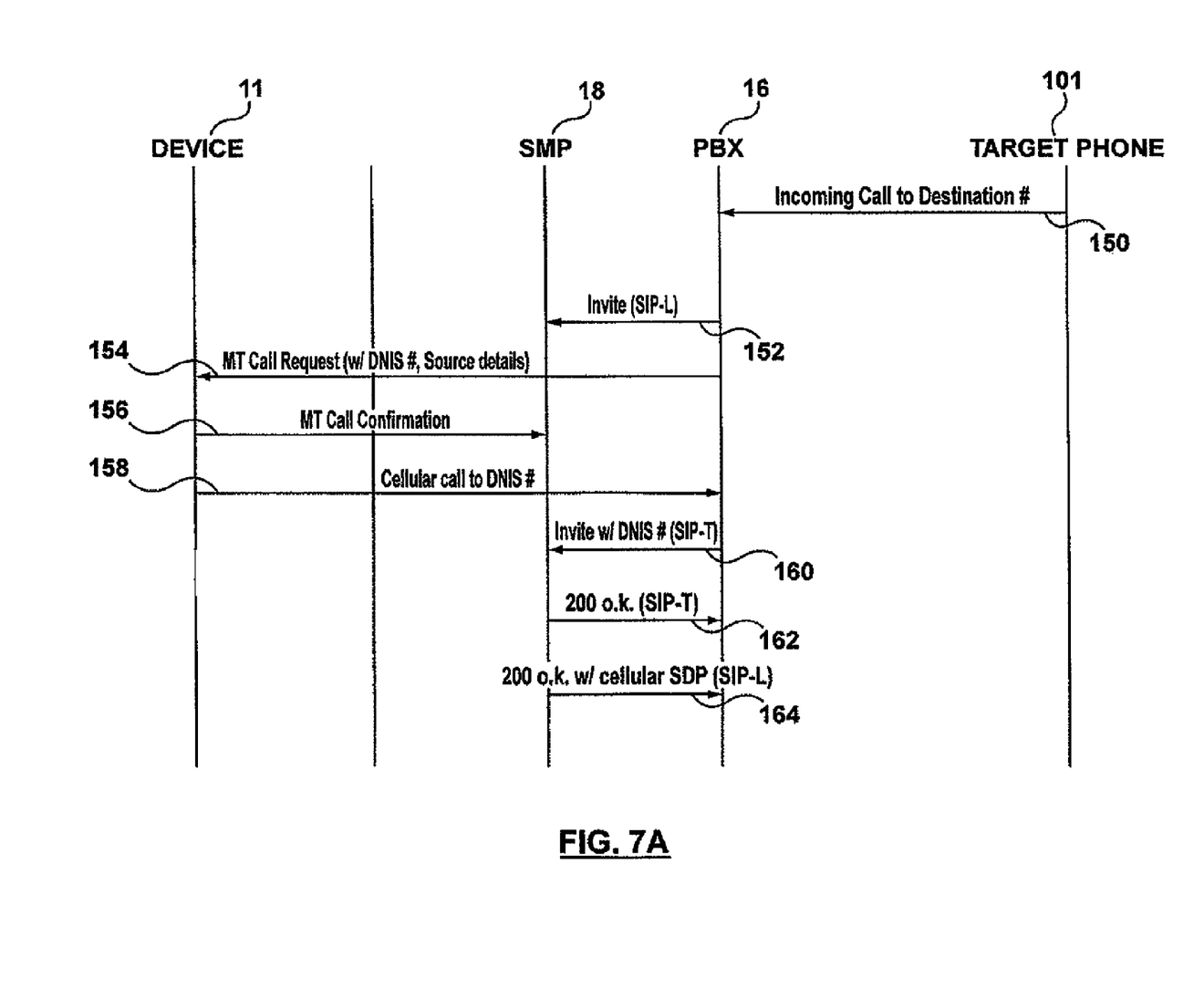
FIG. 7A is a signaling diagram generally indicating how mobile-terminated, mobile-initiated calls are processed by the network of FIG. 5.
Figure 7B:
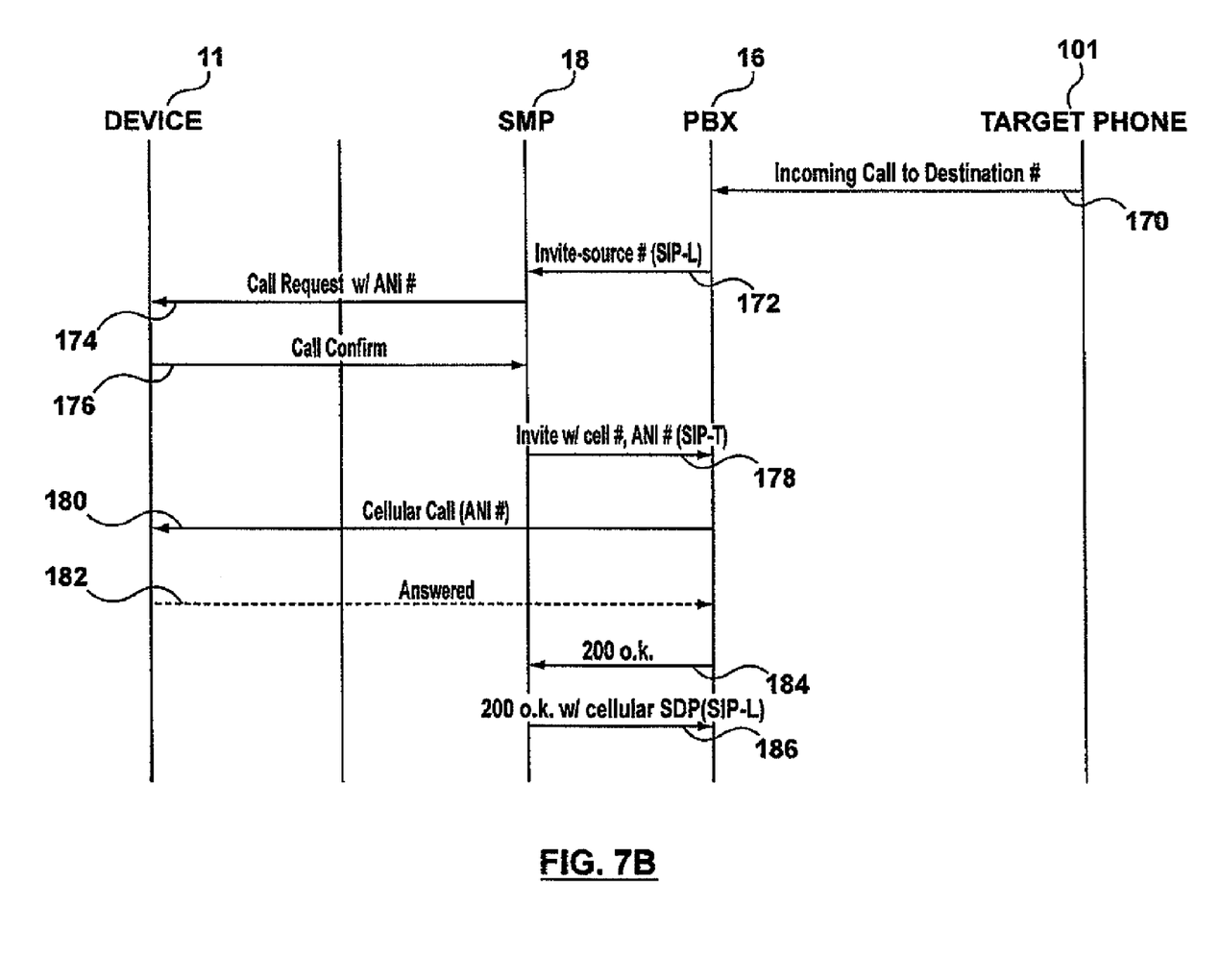
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Figure 8:
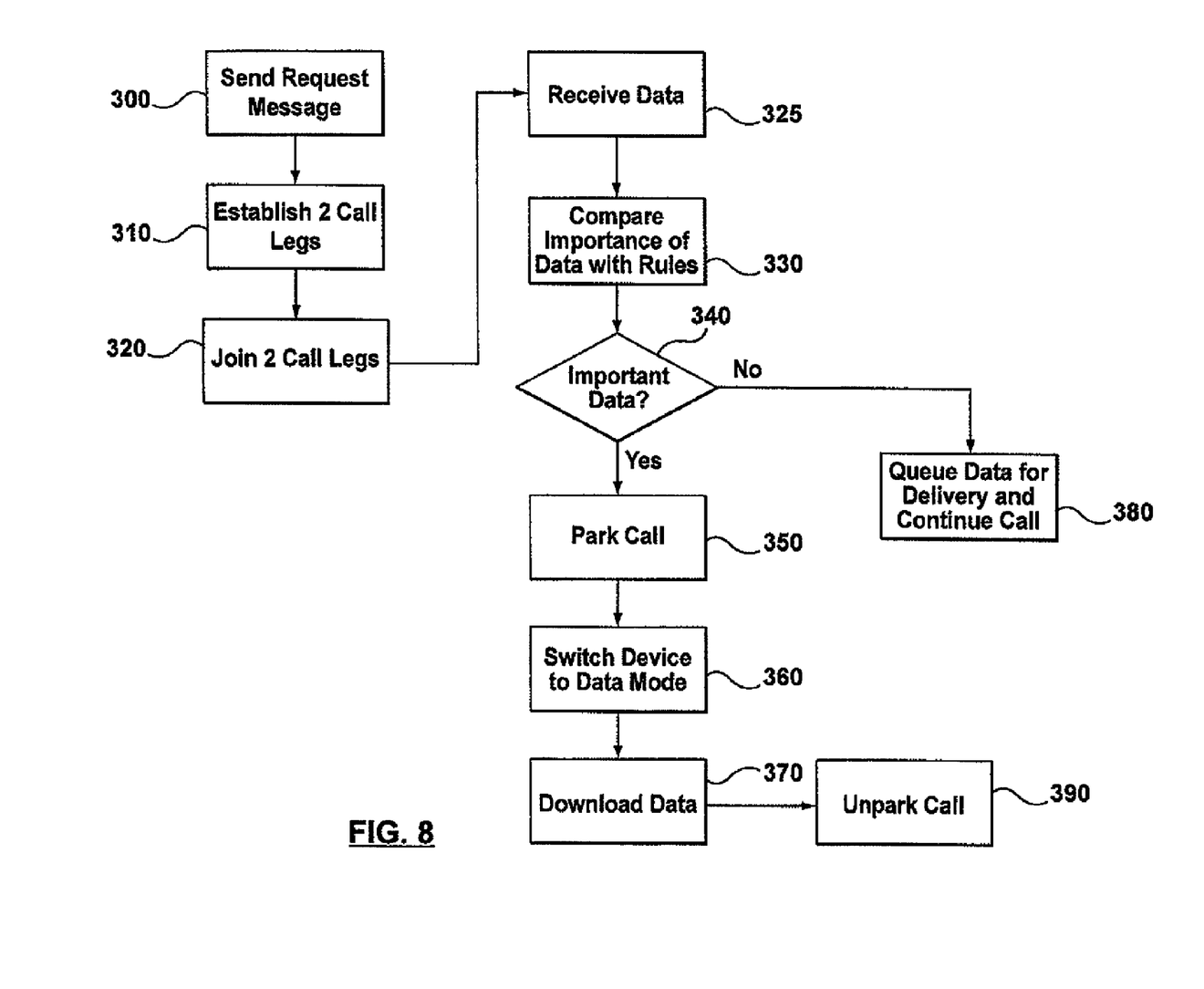
FIG. 8 is a flow diagram illustrating a method carried out by the network environment of FIGS. 1-5 to automatically park a voice call on the mobile electronic device so that the device can receive data, according to an exemplary embodiment.

Turning to FIG. 8, the general operation of the system 10 using SIP 80 as the signaling protocol will be discussed, for parking a voice call on the mobile device 11 so that the device can receive data from the enterprise server 12. A request message is sent from mobile device 11 (or target phone 101) (block 300), in response to which two call legs are established and connected (block 310), in order to establish an end-to-end bearer communications path (two-way RTP stream) between mobile device 11 and the called party at target phone 101 (block 320), as discussed above with reference to FIGS. 6A-7B.

Upon receipt within the enterprise data server 12 of data intended to be sent to the device 11 (block 325), the server 12 compares the content of the data with a list of user and global rules stored in a database of server 12 (block 330). It should be noted that the data may represent an email communication, SMS communication, calendar item, browser push data, custom software, or other data item, without limitation. The rules used to determine the importance of an email message can include, but are not limited to: filters based on an "importance" tag in the header of an email, filters based on email addresses, filters based on Internet Protocol (IP) addresses, filters based on "whitelists", ranking techniques based on the frequency that email recipients have replied to the user, and ranking techniques based on the frequency that email recipients have clicked on links within email messages sent by the user. In one embodiment, the rules are updated each time the user checks for new email messages. In another embodiment, the rules are updated periodically, regardless of the frequency at which the user checks for emails.

In the event that the data is deemed to be important, as established by the predetermined user and global rules (i.e. a "Yes" at block 340), then server 12 notifies the PBX 16 to park the call in progress (block 350) so that the device can switch to data mode (block 360) and download the data (block 370), for example via one of a mail application or text application of device 11 (or other application such as a browser or calendar application). According to one embodiment, the PBX 16 also provides a notification to the caller prior to parking the call, that the call is about to be parked for important data downloading. If the data is not important (i.e. a "No" at block 340) then the data is queued within server 12 for downloading to device 11 after completion of the call (block 380), at which time the device returns to data mode in the usual manner. Enterprise data server 12 notifies the PBX 16 once the data download is complete, to un-park the call (block 390).

The rules within the database of server 12 may be customized by the user (e.g. if data is tagged as important then park call; if data is from family then park call, etc.) or by a network administrator (e.g. if data is from CEO then park call, if data is from emergency/health safety department then park call, etc.), and can be implemented using CPL (call processing language) scripts or any other suitable mechanism for implementing call processing preferences.

The call park operation at block 350 is a well known telephony feature that allows a call to be put on 'soft' hold and then retrieved later to continue the call. In traditional legacy PBX systems, the parked call is transferred to an unused extension (the call is said to have parked onto a certain extension), by temporarily assigning the extension number to the call. However, as discussed in greater detail below, when implemented using signaling protocols such as Session Initiation Protocol (SIP), call park is implemented using two call legs, as discussed above.

Figure 9:
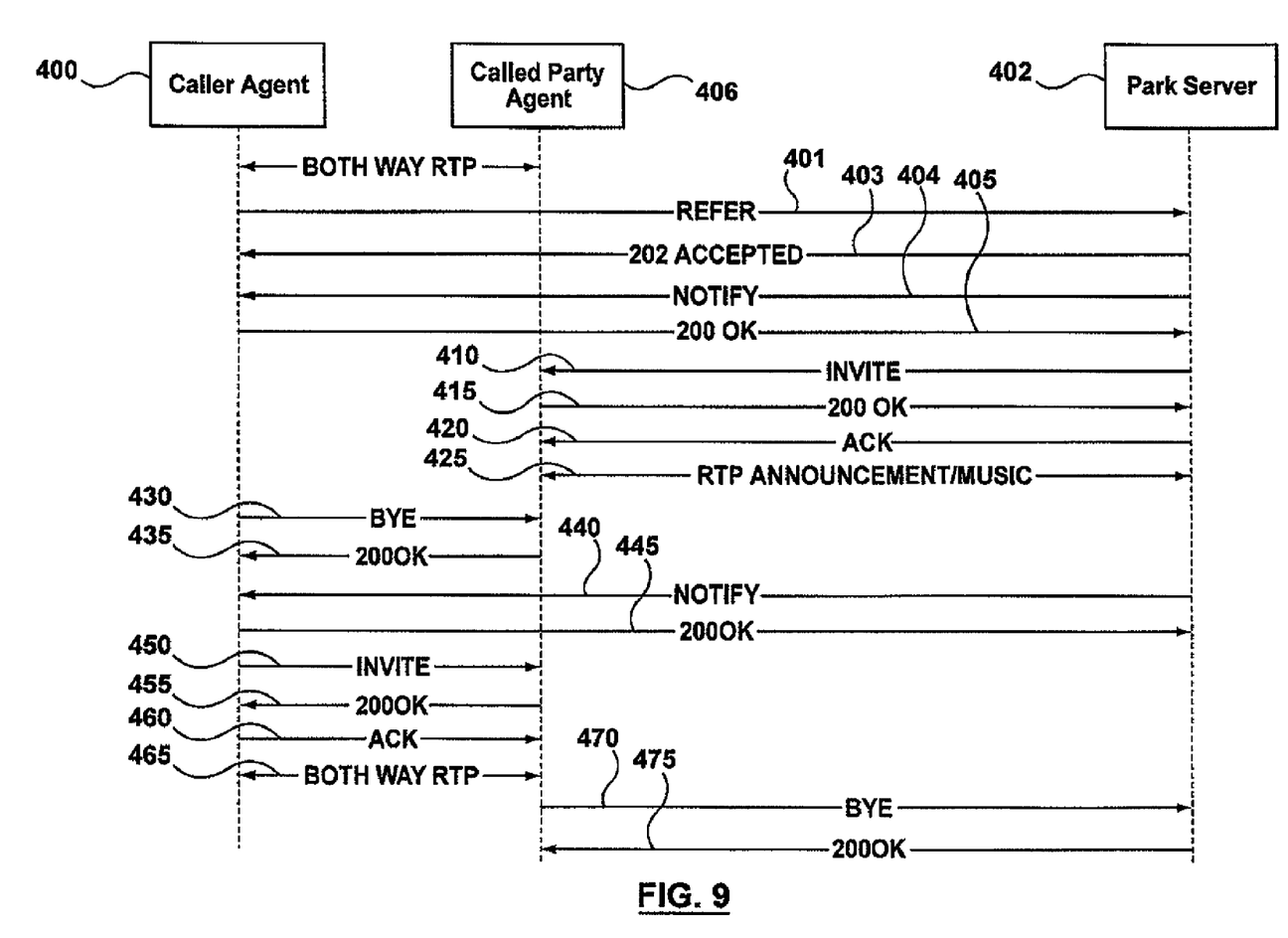
FIG. 9 is a message flow diagram illustrating messages being exchanged between elements of the network environment of FIGS. 1-5 for implementing the method of FIG. 8, according to an exemplary embodiment.

Turning to FIG. 9, a message flow diagram is provided depicting the flow of messages for implementing the call park operation at block 350 and the un-park operation at block 390 of FIG. 8. As indicated above, server 12 notifies the PBX 16 to park the call in progress. Upon receipt of notification from the server 12, a SIP REFER message is sent from a user agent 400 within SMP 18 for the caller at device 11 (block 401), which is accepted by a park server agent 402 within PBX 16 (block 403). The park server 402 immediately reports to the caller at device 11 that it is attempting to call (block 404), which is acknowledged by the caller (block 405). The park server 402 then sends an INVITE message to a called party agent 406 within SMP 18 representing the target phone 101 (block 410), to replace the session between the caller at device 11 and called party at target phone 101. The INVITE message is accepted and acknowledged (blocks 415 and 420), in the usual manner, and an RTP stream is established between the park server 402 and the called party 406 at target phone 101 (block 425). The two call legs between device 11 and target phone 101 are then disconnected (blocks 430 and 435), thereby parking the call.

Once the RTP stream 425 has been established between the park server 402 and called party 406, one or both of the caller and called party may be notified of the successful park (blocks 440 and 445) and, optionally, the anticipated length of the hold, with periodic updates while continuing to hold. For example, if the server 12 is sending a 100MB file that has been marked as urgent, then the server can transmit a voice clip to the PBX 16 to notify the party on hold as to approximately how long it will take to download the data. In addition, the server can send periodic updates to the user on hold for indicating download progress, such as download 50% completed, etc. In one embodiment, the RTP stream from the park server 402 includes an automated voice announcement indicating that the call has been placed on hold pending delivery of important data, followed by music. In another embodiment, the caller at device 11 can be prompted before the data is downloaded, so that the call can be quickly un-parked in the event the call is very important (e.g. the called party is a CEO, etc.).

While the call is parked, the device 11 reverts to data mode (block 360) and the data (e.g. email, text message, calendar item, browser push data, etc.) is downloaded (block 370) in the usual manner by operation of the a application or text application.

Then, in order to un-park the call (block 390), once data downloading has been completed, the caller user agent 400 issues an INVITE to the called party (block 450) for replacing the session between the called party 406 and park server 402, which is accepted and acknowledged in the usual way (blocks 455 and 460). Once the RTP streams have been re-established between the caller and called party (block 465), the called party sends a BYE message to the park server 402 (block 470), which is acknowledged in the usual way (block 475).

The above embodiments may realize one or more potential advantages. For example, hospitals will permit only a very limited time (e.g. 20-25 minutes) for potential organ transplant recipients to respond when a transplant organ becomes available. Parking a call-in-progress for delivery of an urgent text or mail message from the hospital could possibly save a life.

The above embodiments are for illustration, and although one or more particular embodiments of the device and method have been described herein, changes and modifications may be made thereto. For example, although the embodiments discussed above have been discussed in terms of parking a call placed by a calling party (rather than remote receiving or called party), the principles set forth herein apply equally to parking a call at the called party for downloading urgent data. Also, although the embodiments discussed above have been discussed in terms of downloading important data to 2G devices, the principles set forth herein apply equally to parking a call at a 3G device for downloading urgent data at a faster rate than is possible when the device is involved in a voice call. All such changes and modifications are believed to be encompassed by the present disclosure in its broadest aspects and as set forth in the following claims.

The invention claimed is:

1. A system, comprising:
   at least one mobile electronic device having a voice mode and a data mode of operation;
   a switch for establishing a voice call at said at least one mobile electronic device;
   a database for storing at least one call processing rule;
   an enterprise data server receiving data intended for said mobile electronic device, accessing said database and comparing contents of the data with said at least one rule; and in the event that the contents match said at least one rule then notifying said switch to park the call, switching the device to a data mode of operation and downloading the data to the device while the switch has parked the call, and notifying said switch to un-park the call, wherein upon receipt of notification from the enterprise data server to park the call, a user agent within the switch sends a Session Initiation Protocol (SIP) REFER message to a park server agent within the switch which in response sends an INVITE message to a remote party to replace said call between the mobile electronic device and remote party with a Real-time Transport Protocol (RTP) stream between the park server and remote party.

2. The system according to claim 1, wherein said switch is a SIP-capable Private Branch Exchange (PBX).

3. The system according to claim 1, wherein said mobile electronic device is a 2G mobile electronic device.

4. The system according to claim 1, wherein the Real-time Transport Protocol (RTP) stream includes an automated voice announcement indicating that the call has been place on hold pending delivery of an important data message.

5. The system according to claim 1, wherein upon receipt of notification from the enterprise data server to un-park the call, the user agent issues an INVITE to the remote party for replacing the session between the remote party and park server with a two-way Real-time Transport Protocol (RTP) stream between the mobile electronic device and remote party.

6. The system according to claim 1, wherein said at least one rule includes an importance threshold.

7. The system according to claim 1, wherein said park server agent includes functionality for inserting a voice announcement in said Real-time Transport Protocol (RTP) stream for announcing that the call has been parked pending delivery of an important data message.

8. The system according to claim 7, wherein said announcement is made to at least one of the mobile electronic device and remote party.

* * * * *